United States Patent [19]

Gryskiewicz

[11] 4,299,283

[45] Nov. 10, 1981

[54] STRIP STRUCTURE FOR WELL SCREEN

[75] Inventor: Gregory A. Gryskiewicz, North St. Paul, Minn.

[73] Assignee: Reese Enterprises, Inc., Rosemount, Minn.

[21] Appl. No.: 163,198

[22] Filed: Jun. 26, 1980

[51] Int. Cl.³ .............................................. E21B 43/08
[52] U.S. Cl. ................................... 166/231; 166/234; 210/497.1
[58] Field of Search ............... 166/231, 232, 227, 233, 166/234, 242; 52/730, 309.1; 428/65; 210/497.1

[56] References Cited

U.S. PATENT DOCUMENTS

| | | | |
|---|---|---|---|
| 1,858,592 | 5/1932 | Johnson . | |
| 3,327,865 | 6/1967 | Thompson | 166/227 |
| 3,385,373 | 5/1968 | Brown | 166/332 |
| 3,561,605 | 2/1971 | Likness | 166/231 |
| 3,584,685 | 6/1971 | Boyd | 166/231 |
| 3,658,128 | 4/1972 | Shobert | 166/231 |
| 3,667,615 | 6/1972 | Likness | 166/231 |
| 3,709,293 | 1/1973 | Layne | 166/232 |
| 3,864,182 | 2/1975 | Shobert | 166/232 |
| 4,068,713 | 6/1978 | McGuire | 166/233 |

*Primary Examiner*—William F. Pate, III
*Attorney, Agent, or Firm*—Leo Gregory

[57] ABSTRACT

A well screen formed of an extruded wedge shaped plastic strip wound about cylindrically disposed supporting rods in which the flexible strip is extruded of dual durometer dissimilar materials in the form of a unitary strip having complementary characteristics in which one body portion is formed of a suitable substantially rigid plastic material and another body portion is formed of a plastic material which has relatively greater strength characteristics whereby in the event of cracking of one of the portions, the strip is held together in a useable condition by the other body portion and a coating of abrasive resistant material is extruded unitarily with the strip to form an outer surface portion having substantial resistance to wear.

9 Claims, 7 Drawing Figures

STRIP STRUCTURE FOR WELL SCREEN

BACKGROUND OF THE INVENTION

1. Field of the Invention

This invention relates particularly to the strip material used to form well screen structures.

2. Description of the Prior Art

It is not an uncommon practice in the prior art to form well screens by winding a strip about supporting rods to form a substantially cylindrical screen. However, in the prior art practice, it is apparent that the strip material used is formed of a uniform material and a wire core is also known to be used.

In U.S. Letters Patent No. 1,858,592 it is disclosed that a ribbon is wound about supporting rods with no description being given of the substance of the ribbon. In U.S. Letters Patent No. 4,068,713 there is disclosed the use of a PVC strip wound about a core. In U.S. Pat. No. 3,385,373 there is disclosed the use of a strip of plastic having a metal wire core to be wound about supporting rods. In U.S. Pat. No. 3,864,182 there is shown the use of a high density polyethylene.

In U.S. Pat. No. 3,709,293 a wedge shaped wire is shown wrapped about supporting rods but the substance of the wire is not defined. In U.S. Pat. No. 3,658,128 there is defined a strip formed of bundles of glass filaments embodied in a resin forming the outer surface of a well screen.

The invention herein makes a disclosure with respect to the use of a dual durometer strip material of two or more dissimilar material which is particularly adapted to withstand handling and installation of stresses to provide a long useful life.

SUMMARY OF THE INVENTION

It is desirable and an object of this invention to provide a strip for forming a well screen in the prior art manner of being wound about supporting rods with the strip being made of dual durometer dissimilar materials embodying such characteristics that damage otherwise caused by physical impacts occurring during handling and installation is avoided.

It is another object of this invention to provide a wedge shaped strip for forming a well screen with said strip being formed as an extrusion embodying dual durometer dissimilar materials having a body portion formed of a substantially rigid plastic material for an outer surface body portion and having an integral body portion extruded therewith formed of a substantially resilient dissimilar plastic material and which in combination provide superior strength characteristics for resistance to cracking due to physical impact and also due to low range temperature.

It is another object of this invention to provide a wedge shaped strip for the purpose of forming a well screen with the strip embodying an outer body construction of a substantially rigid plastic material such as PVC and which has inserted therein integral therewith a body portion of a dissimilar plastic material such as ABS which is superior in withstanding cracking and which upon the outer body portion cracking as a result of impact or expansion and contraction, tends to hold said outer body portion in an integral condition and which otherwise would not be suitable for use.

It is more specifically an object of this invention to provide a wedge shaped strip adapted to be wound about a core of supporting rods, said strip being extruded as an integral construction of dual durometer dissimilar materials having a substantially rigid outer body portion such as of rigid PVC plastic material and a substantially flexible inner body portion such as of ABS plastic material which is better able to withstand the adverse effects of physical impact responsive to which said outer body portion tends to crack transversely into segments, said outer body portion being retained in an operating condition by said inner body portion and an abrasive resistant layer being formed integrally with the outer surface of said outer body portion.

These and other objects and advantages of the invention will be set forth in the following description made in connection with the accompanying drawings in which like reference characters refer to similar parts throughout the several views.

DESCRIPTION OF A PREFERRED EMBODIMENT

Figure 1:
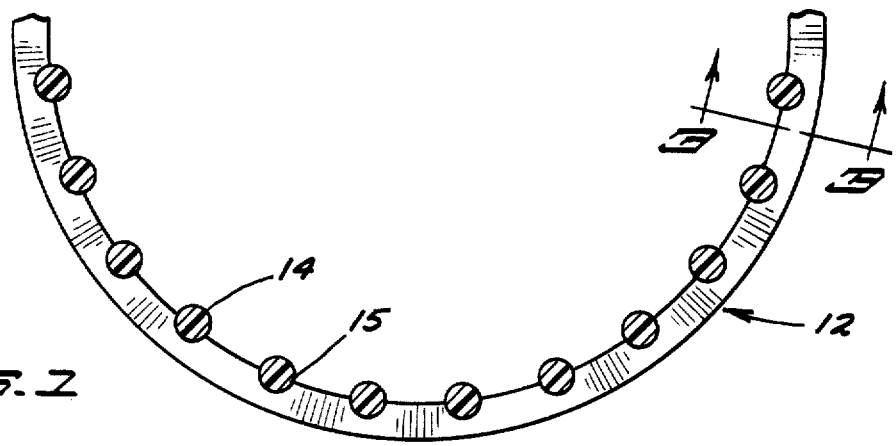
FIG. 1 is a fragmentary top plan view.

Referring to the drawings, in FIG. 1 is indicated a well screen structure 10, the same being shown formed of an elongated strip member 12 wound helically about axially disposed circumferentially spaced rods 14 and being secured thereto as by being spot fused or welded as at 15 to form a substantially cylindrical well screen.

Figure 3:
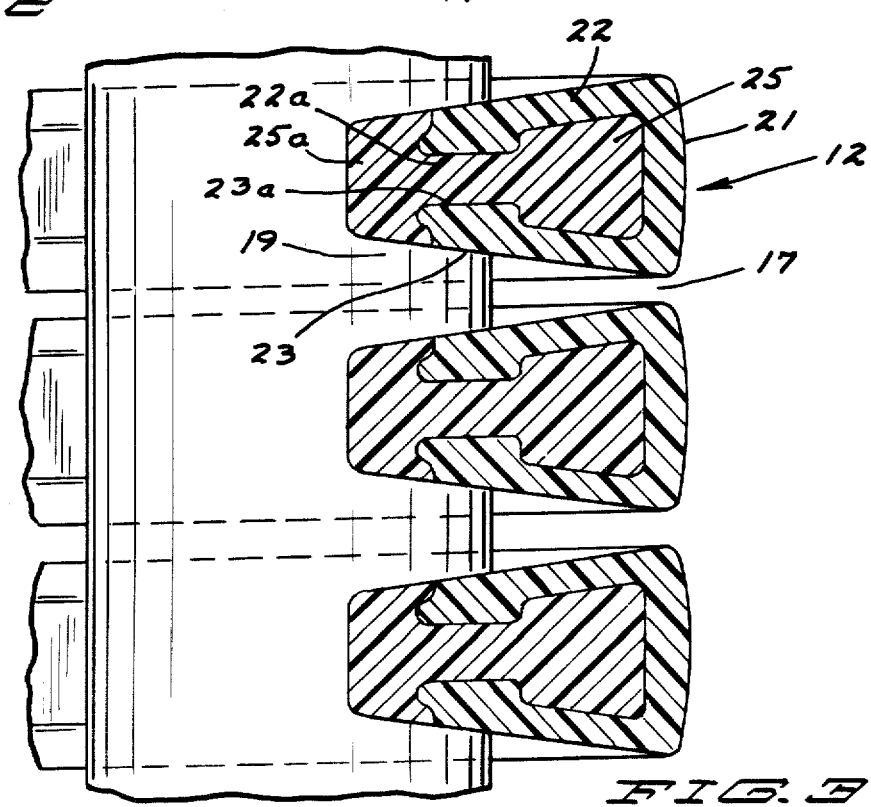
FIG. 3 is a fragmentary view in horizontal section on an enlarged scale taken on line 3—3 of FIG. 1 as indicated.

With reference to FIG. 3, on an enlarged scale, a sectional view is shown of said strip member 12 to indicate its wedge shape in cross section whereby the spacing between the wound layers of said strip member is narrow at the outer side as at 17 and is wider at the inner side as at 19 to inhibit the passage into said well screen of foreign material.

Referring again particularly to FIG. 3 and the sectional view of the strip member 12, an embodiment of one form of strip structure is shown.

Said strip member 12 is formed as an extrusion and is here indicated having an upper outer body or shell portion 21 preferably formed of a substantially rigid PVC which is sufficiently yielding in strip form to be wound helically as shown. Said body portion 2 has inwardly angled side portions 22 and 23 which are shown having at their free ends inwardly projecting portions 22a and 23a. PVC is a desirable material for forming the outer surface portion of a well screen.

Formed within said body portion 21 as a core and extruded therewith for a unitary structure is a body portion 25 having a portion 25a thereof extending below said side portions 22 and 23 to complete the form of said strip to be that of a wedge in cross section. The body portion 25 and its extended portion 25a are formed of a dissimilar yielding plastic material and preferably is formed of the plastic material commonly known in the art as ABS.

The strip member 12 is welded to the rods 14 at each point of engagement as at 15 with the extended body portion 25a and this welding is well known in the art. It will be noted that the rods appear to be partially recessed into the strip member at the points of engagement but this is the result of the welding process in causing a fusion or bonding between the rods and the strip member.

A PVC strip is commonly used in forming well screens and at the weld point of contact with the rods, there is a tendency for transverse cracking to take place as the body portion of the strip has been weakened and said PVC material is subject to impact fracture at the weld points. In being welded to a more crack resistant core material, as is the case in the present invention, the tendency to crack is lessened.

The tendency of the body portion 21 to crack due to physical impact or stress during handling and installation causes the well screen to lose its usefulness. In the present construction as here indicated, the core body portion 25 is highly resistant to cracking and in securing the rods 14 to the body portion 25 there is avoided the cracking which would result from having said rods 14 secured to and thus weakening said body portion 21. Under this arrangement, any cracked segments which may develop in the body portion 21 are ratained in being bonded to the body portion 25 to preserve and extend the useful life of the well screen.

Thus by the combination of dual durometer characteristics indicated, said strip member provides a substantial improvement in a well screen construction.

Figure 4:
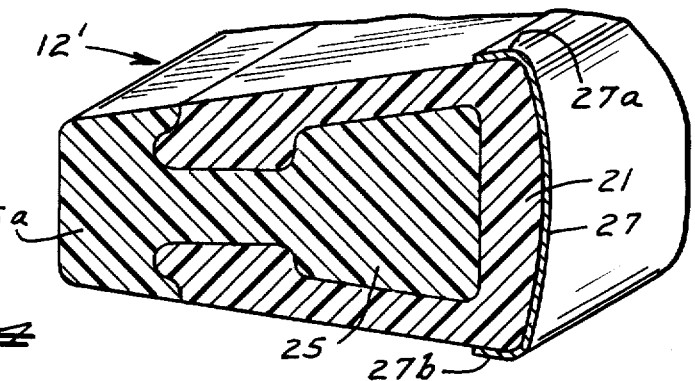
FIGS. 4–6 respectively, are views in section with each showing a modification of a detail of structure.

Referring to FIG. 4, the structure of said strip 12 with like reference numerals is shown as 12' as modified to the extent of having extruded integrally therewith an outer end body portion or layer 27 extending transversely to overlie the outer end portion, the upper side portion extending transversely to partially overlie the side walls of said strip member as at 27a and 27b.

Said layer 27 is preferably formed of a tough resilient plastic material as polyurethane which is very resistant to the abrasive effect of the environment surrounding the well screen in its operating position.

Figure 5:
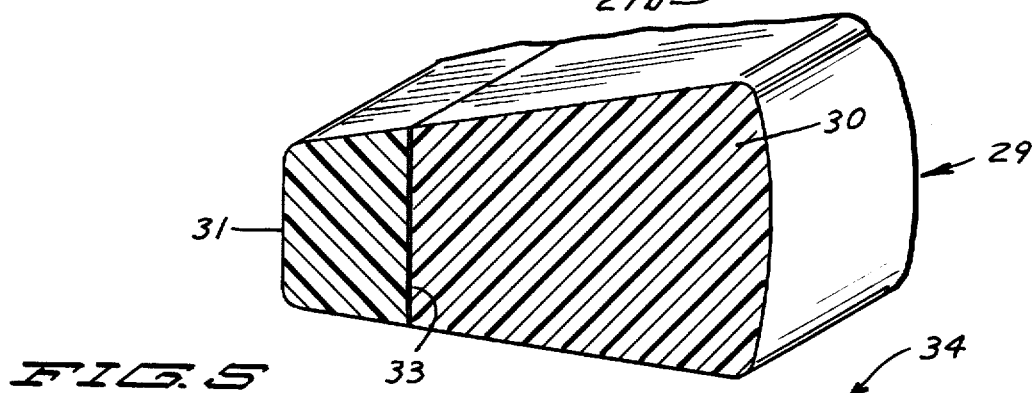

FIG. 5 shows another modification of said strip 12 is indicated by the reference numeral 29 in which the major upper portion 30 thereof is preferably formed of a sutstantially rigid plastic material such as PVC, the lower portion 31 thereof is formed of a more cracking resistant plastic material such as ABS and these two materials are extruded to be unitary with an interfacing layer 33. Said interfacing layer 33 will be formed of a relatively soft plastic material suitable for this purpose and which will serve as a boundary to prevent the extension of any cracks therethrough and to retain in position such portions of the strip portion 30 as may have a tendency to crack.

Figure 6:
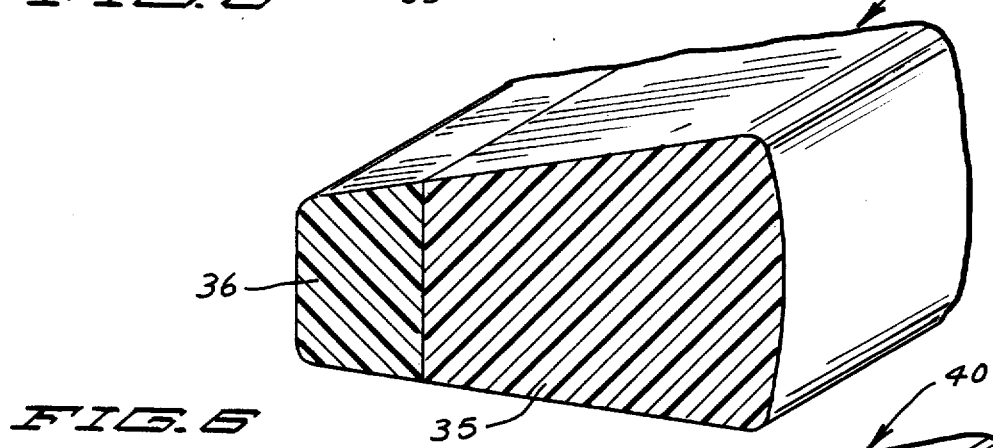
Figure 7:
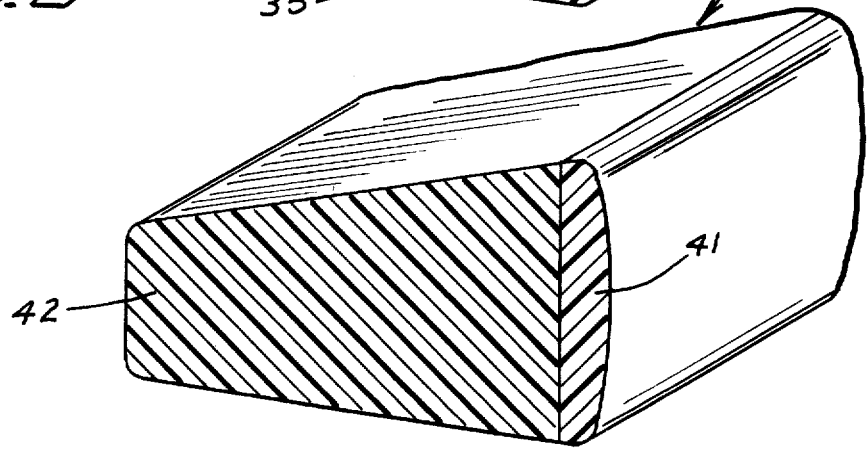

In FIGS. 6 and 7 further modifications are shown of said strip member 12, the same here being formed of like materials in different relative proportions and are indicated respectively by the reference numerals 34 and 40.

In FIG. 6, the rigid body portion of said strip 34 is indicated at 35 and the other body portion thereof is indicated at 36 and these correspond in materials to the body portions 21 and 25 of said strip member 12.

In FIG. 7, the relatively rigid portion of the strip 40 such as of PVC is indicated at 41 and the other dissimilar portion thereof such as being formed of ABS material is indicated at 42.

OPERATION

Figure 2:
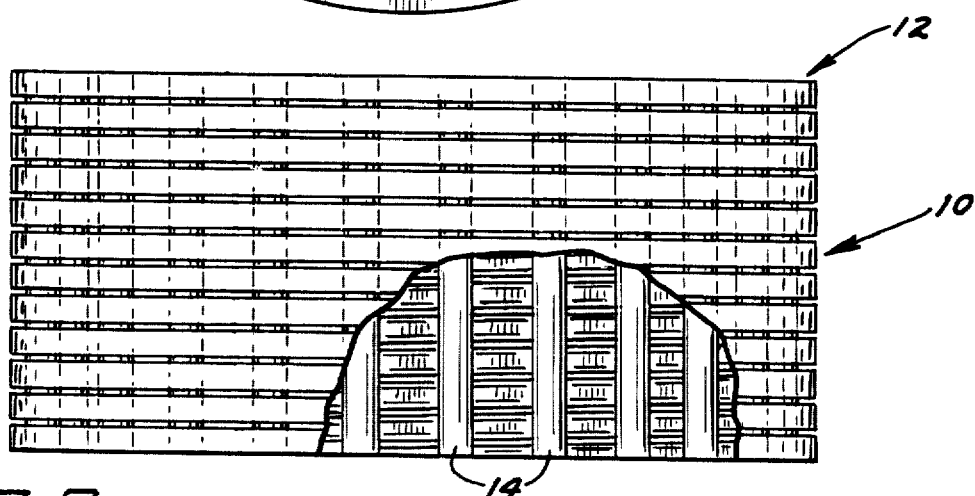
FIG. 2 is a view in side elevation with a portion broken away.

The well screen 10 is formed in a conventional manner to appear as indicated in FIGS. 1 and 2. The rods 14 are welded to the strip member 12 at their points of engagement as indicated at 15 and this welding or fusing process bonds the rods to the strip member helically wound thereabout. At the point of each weld there is a depression into the strip caused by the welding process. This causes a weakened spot in the strip. In a strip such as of PVC there would be a tendency for cracks to appear at notched or depressed portions thereof. Hence it is at the weld spots that the tendency to crack will first occur. In the structure of the embodiments herein presented, the portion of the helically wound strip which is welded to the rods is the more resilient and flexible portion of the strip such as the portion 25 of strip 12 which has substantial resistance to cracking at said weld points and also the material of this portion is of a character to withstand a low range of temperature without adverse effect. Thus there is provided a strip member having complementary characteristics providing substantial improvement in a well screen.

In the reference to the Brown patent hereinabove, a metal core is shown used with the strip material which is referred therein as reinforced plastic rope. However the integral bonding of the strip herein appears to provide a more suitable and satisfactory means of unitarily retaining the rigid portion of the strip and preserving and extending its usefulness.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

What is claimed is:

1. An extruded strip member helically wound about axially disposed circumferentially spaced supporting rods and welded thereto to form a substantially cylindrical well screen, said strip member having in combination the body portion of said strip member being wedge shaped in cross section having its narrower portion inwardly of said well screen and its wider portion outwardly of said well screen, said wider portion of said strip member being formed of a substantially rigid plastic material, said narrower portion of said strip member being formed of a plastic material which is relatively free from any cracking effect at the weld points of being secured to supporting rods, said wider and narrower portions being unitary in structure, and whereby said narrower portion retains said wider portion in position when said wider portion is in cracked condition.

2. The structure set forth in claim 1, wherein
    an abrasive resistant layer of plastic material overlies the outer surface of said wider portion and is unitary therewith.

3. The structure set forth in claim 1, wherein said narrower portion of said strip member forms a core for said wider portion and forms a projecting end portion thereof facing inwardly of said well screen.

4. The structure set forth in claim 1, wherein
    said wider portion of said strip member forms a relatively narrow depth thereof comprising the portion thereof facing outwardly of said well screen, and said narrower portion of said strip member forms the remainder thereof facing inwardly of said well screen.

5. The structure set forth in claim 1, wherein
a flexible layer of plastic material forms an interface between said wider and said narrower portions of said strip member and is unitary therewith.

6. The structure set forth in claim 1, wherein
said wider portion of said strip member is formed of a PVC plastic material, and
said narrower portion of said strip member is formed of an ABS plastic material.

7. The structure set forth in claim 2, wherein
said abrasive resistant layer is formed of a polyurethane material.

8. The structure set forth in claim 1, wherein
said narrower portion and said wider portion of said strip member are extruded unitarily to form a dual durometer strip member.

9. The structure set forth in claim 1, wherein
said narrower portion and said wider portion of said strip member are extruded unitarily of dissimilar materials.

* * * * *